(12) United States Patent
Lin et al.

(10) Patent No.: US 11,084,471 B2
(45) Date of Patent: Aug. 10, 2021

(54) BRAKING CONTROL METHOD ACCORDING TO FRICTION OF ROAD SURFACE

(71) Applicant: AUTOMOTIVE RESEARCH & TESTING CENTER, Changhua Hsien (TW)

(72) Inventors: Hsin-Chuan Lin, Changhua Hsien (TW); Jia-Le Wei, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 116 days.

(21) Appl. No.: 16/692,888

(22) Filed: Nov. 22, 2019

(65) Prior Publication Data

US 2021/0155212 A1    May 27, 2021

(51) Int. Cl.
  *B60T 8/1763*  (2006.01)
  *B60T 8/32*   (2006.01)
  *B60W 40/068*  (2012.01)
  *B60W 10/18*   (2012.01)

(52) U.S. Cl.
  CPC .......... *B60T 8/1763* (2013.01); *B60T 8/329* (2013.01); *B60W 10/18* (2013.01); *B60W 40/068* (2013.01); *B60T 2210/12* (2013.01); *B60T 2240/03* (2013.01); *B60W 2520/26* (2013.01); *B60W 2520/28* (2013.01)

(58) Field of Classification Search
  CPC .... B60T 8/1763; B60T 8/329; B60T 2210/12; B60T 2240/03; B60W 40/068; B60W 10/18; B60W 2520/26; B60W 2520/28
  See application file for complete search history.

(56) References Cited

U.S. PATENT DOCUMENTS

| | | | | |
|---|---|---|---|---|
| 5,249,641 A | * | 10/1993 | Sakata | B60T 8/175 180/197 |
| 5,518,307 A | * | 5/1996 | Okazaki | B60T 8/172 303/157 |
| 5,906,650 A | * | 5/1999 | Tsuno | B60T 8/17636 701/71 |
| 6,122,585 A | * | 9/2000 | Ono | B60T 8/172 701/71 |

(Continued)

*Primary Examiner* — Babar Sarwar
(74) *Attorney, Agent, or Firm* — Birch, Stewart, Kolasch & Birch, LLP

(57) ABSTRACT

A braking control method according to friction of road surface includes computing a real-time wheel speed according to a signal received from a wheel speed sensor; storing the real-time wheel speed as a wheel initial velocity when a braking event occurs; determining a relative-peak value according to the real-time wheel speed; estimating a vehicle deceleration according to the relative-peak value and the wheel initial velocity; computing an adjustment parameter according to the vehicle deceleration and a tire slip threshold, wherein the adjustment parameter reflects friction coefficient of road surface; and adjusting time length of an enhancement stage in an enhance-pressure control period of a stepped pressure-increasing phase according to the adjustment parameter; or adjusting time length of a reduction stage in a reduce-pressure control period of a stepped pressure-decreasing phase according to the adjustment parameter.

18 Claims, 11 Drawing Sheets

(56) References Cited

U.S. PATENT DOCUMENTS

| | | | | |
|---|---|---|---|---|
| 6,164,119 | A * | 12/2000 | Miyazaki | G01L 5/162 |
| | | | | 73/11.07 |
| 2003/0028308 | A1* | 2/2003 | Ishikawa | B60T 8/1764 |
| | | | | 701/71 |
| 2005/0085987 | A1* | 4/2005 | Yokota | B60C 23/0477 |
| | | | | 701/80 |
| 2006/0219000 | A1* | 10/2006 | Miyoshi | B60T 8/1725 |
| | | | | 73/146 |
| 2007/0142996 | A1* | 6/2007 | Lee | B60W 30/16 |
| | | | | 701/96 |
| 2010/0131165 | A1* | 5/2010 | Salman | B60T 8/172 |
| | | | | 701/70 |
| 2012/0022747 | A1* | 1/2012 | Zagorski | B60T 8/172 |
| | | | | 701/48 |
| 2013/0103279 | A1* | 4/2013 | Asano | B60T 8/1755 |
| | | | | 701/72 |
| 2014/0163770 | A1* | 6/2014 | Wakao | B60W 40/068 |
| | | | | 701/1 |
| 2015/0019058 | A1* | 1/2015 | Georgiev | B60L 3/108 |
| | | | | 701/22 |
| 2016/0368503 | A1* | 12/2016 | Jonasson | B60W 40/064 |
| 2018/0015931 | A1* | 1/2018 | Berntorp | B60T 8/172 |
| 2018/0154777 | A1* | 6/2018 | Hall | B60L 7/26 |
| 2018/0273046 | A1* | 9/2018 | Berntorp | B60W 40/12 |
| 2019/0193568 | A1* | 6/2019 | Cho | B60T 8/17616 |
| 2019/0263392 | A1* | 8/2019 | Imamura | B60K 17/35 |
| 2020/0086877 | A1* | 3/2020 | Zhang | B60W 30/18172 |
| 2020/0130660 | A1* | 4/2020 | Cho | B60W 10/20 |
| 2021/0046939 | A1* | 2/2021 | Dickinson | B60L 7/18 |
| 2021/0101603 | A1* | 4/2021 | Lee | B60W 30/02 |

\* cited by examiner

BRAKING CONTROL METHOD ACCORDING TO FRICTION OF ROAD SURFACE

BACKGROUND OF THE INVENTION

1. Field of the Invention

The present application relates generally to a braking control method, and more particularly to a braking control method according to friction of road surface.

2. Description of Related Art

Vehicle technology has been focused on Advanced Driver Assistance System (ADAS) for a long time. The purpose of ADAS is to assist the driver in driving the vehicle (such as a car, a truck, a scooter, and so on). ADAS will protect the driver, the passengers, people on the roads, and road facilities from dangers or damages.

For example, with reference to FIG. 8, a conventional Electronic Stability Control system (ESC) comprises a control module 30 and multiple sensors connected to the control module 30. The multiple sensors will include a wheel speed sensor 31, an accelerometer 32, a steering angle sensor 33, and a yaw-rate sensor 34. The control module 30 will be electrically connected to the powertrain system 40, the steering system 41, the braking system 42, and so on for signal transmission. The control module 30 determines whether the vehicle enters an unstable state according to the measurement values received from the sensors. When the vehicle is in the unstable state, the control module 30 will actively intervene the operation of the vehicle by, for example, regulating braking force of inner and outer wheels, restricting traction force, and regulating the braking pressure of the oil hydraulic device of the braking system 42 in order to stabilize the vehicle and avoid losing control of the vehicle.

For another example, with reference to FIG. 9, a conventional Anti-lock Braking System (ABS) comprises a control module 50 and a wheel speed sensor 51 electrically connected to the control module 50 for signal transmission. The control module 50 is electrically connected to the braking system 60 of the vehicle for signal transmission to regulate the hydraulic pressure of the braking system 60. The control module 50 receives the signal from the speed sensor 51 and figures the wheel deceleration and the tire slip to decide whether to actuate the solenoid and regulate the hydraulic pressure of the braking system, wherein the tire slip is a difference between the vehicle velocity (kilometers per hour) and wheel speed (kilometers per hour) and will be represented as:

$$\text{tire slip}(\%) = \frac{|\text{vehicle velocity} - \text{wheel speed}|}{\text{vehicle velocity}} \times 100(\%)$$

Compared with ESC, ABS only has the wheel speed sensor 51 and thus has fewer sensors than ESC. The hardware cost of ABS is much lower than the hardware cost of ESC.

The conventional control process of ABS is briefly described as follows. The control module 50 at first determines whether a braking event, such as when the brake pedal of the vehicle is pressed down, occurs. When the braking event is occurring, the vehicle velocity will slow down while the control module 50 determines whether the vehicle state meets an early warning condition. The early warning condition will include that the wheel acceleration is lower than a lower threshold and the tire slip meets an upper threshold. When the vehicle state meets the early warning condition, the wheel speed rapidly slows down but the vehicle velocity does not slow down accordingly as expected, causing that the wheels will be locked and the vehicle will slip on the road. On the contrary, when the vehicle state does not meet the early warning condition, the vehicle is still controllable by the driver, such that the control module 50 does not intervene the operation of the vehicle.

The following paragraphs describe examples of the conventional control process of ABS. With reference to FIGS. 10A-10C, FIG. 10A is a curve diagram of the vehicle velocity and wheel speed, FIG. 10B is a curve diagram of wheel acceleration, and FIG. 10C is a curve diagram of braking pressure. As shown in FIG. 10C, the brake pedal is pressed down at $t_0$, the control module 50 accordingly determines the braking event occurs at $t_0$ and the braking pressure gradually increases as time goes on. After $t_0$, as shown in FIG. 10 A, the vehicle velocity and the wheel speed decrease and the tire slip increases accordingly, and as shown in FIG. 10B, the wheel acceleration decreases. Meanwhile, the control module 50 determines whether the vehicle state meets the early warning threshold.

When the wheel acceleration is lower than the lower threshold ($-a_{th}$) and the tire slip meets the upper threshold at $t_1$, the control module 50 determines that the vehicle state has met the early warning threshold, which means the wheels will be rapidly locked up and the vehicle will slip on the road. Then the control module 50 actively intervenes the operation of the vehicle.

For example, the control process of the control module 50 will enter a pressure retaining state when the control module 50 determines that the wheel acceleration is lower than the lower threshold ($-a_{th}$) at $t_1$. Then the control module 50 determines that the tire slip meets the upper threshold at $t_2$ and the control process will enter a pressure decreasing state. Afterwards, when the control module 50 determines that the wheel acceleration returns to the lower threshold ($-a_{th}$) at $t_3$ due to the foregoing pressure decreasing state, the control process will enter the pressure retaining state. As a result, because the pressure retaining state is performed corresponding to a lower braking pressure, the wheels rotate faster and the wheel acceleration gradually rises accordingly.

Along with the increasing wheel acceleration, with reference to FIG. 10B, when the control module 50 determines that the wheel acceleration meets a limitation $a_{limit}$ at $t_4$, the control process enters a pressure increasing state to enhance the braking pressure. Because the braking pressure is enhanced, the wheel acceleration becomes lower. Afterwards, when the control module 50 determines that the wheel acceleration is lower than the limitation $a_{limit}$ at $t_5$, the control process enters a pressure retaining state. During the control process of the pressure retaining state, the wheel acceleration decreases accordingly. When the control module 50 determines that the wheel acceleration is lower than the upper threshold ($+a_{th}$) at $t_6$, the control process enters a stepped pressure increasing mode. Hence, the following control process to increase or decrease the braking pressure will be deduced from the foregoing descriptions. As shown in FIG. 10C, in the stepped pressure increasing mode after $t_6$, the braking pressure is increased step by step. As time goes on, when the wheel acceleration is lower than the lower threshold ($-a_{th}$) at $t_7$, the control process enters a pressure decreasing state. As shown in FIG. 10C, the stepped pressure increasing mode includes a pressure increasing state and a pressure retaining state. The pressure increasing state and the pressure retaining state form an enhance-pressure control period with a time length of $T_{increase}$.

As mentioned above, in other words, with reference to 10C, an intermittent brake mode performed by the control module 50 includes a pressure-decreasing phase from $t_2$ to $t_3$, a pressure-retaining phase from $t_3$ to $t_4$, and a stepped pressure-increasing phase from $t_6$ to $t_7$, wherein the pressure-decreasing phase, the pressure-retaining phase, and stepped the pressure-increasing phase occur in sequence. The stepped pressure-increasing phase includes one or more than one enhance-pressure control periods $T_{increase}$ in sequence to increase the braking pressure step by step. Each enhance-pressure control period $T_{increase}$ includes an enhancement stage and a retention stage after the enhancement stage. The pressure increasing speed (pressure increase in a unit of time) of the enhancement stage will be a control parameter preset in the control module 50.

As shown in FIG. 10B, during the stepped pressure-increasing phase, the wheel acceleration decreases as time goes on, such that the wheels will still rotate at a certain speed to maintain the friction against the road surface and the increase of the tire slip will slow down. When the control module 50 determines that the vehicle state meets the early warning threshold at $t_7$, which means the deceleration of the wheels is too fast or the tire slip is too large, the process of the intermittent brake mode will enter a next pressure-decreasing phase, a next pressure-retaining phase, a next pressure-increasing phase, and so on, until the control module 50 determines that no braking event occurs or another condition is met.

The foregoing paragraphs introduces that the intermittent brake mode will include the stepped pressure-increasing phase. Besides, the intermittent brake mode will include a stepped pressure-decreasing phase. As shown in FIGS. 11A and 11B, in another example, after the control module 50 actively intervenes the operation of the vehicle at $t_1$ and performs the intermittent brake mode, the pressure-decreasing phase at first will be the stepped pressure-decreasing phase including one or more than one reduce-pressure control period $T_{decrease}$ in sequence to decrease the braking pressure step by step, rather than continuously decrease the braking pressure as described in the foregoing example. FIG. 11B shows one reduce-pressure control period $T_{decrease}$ from $t_1$ to $t_2$. Each reduce-pressure control period $T_{decrease}$ includes a reduction stage and a retention stage. The pressure decreasing speed (pressure decrease in a unit of time) of the reduction stage will be an adjustable control parameter preset in the control module 50. As shown in FIG. 11B, after the stepped pressure-decreasing phase, the pressure-retaining phase from $t_3$ to $t_4$ and the stepped pressure-increasing phase from $t_4$ to $t_5$ are performed in sequence.

The pressure increasing/decreasing speeds are control parameters preset in the control module 50, and the time length of the enhancement stage and the time length of the reduction stage are constants. As a result, although the conventional intermittent brake mode performed by ABS would be helpful in stabilizing the vehicle in emergency braking, such constants of the enhancement stage and the reduction stage are not adaptable to different road environments.

For example, the road environments change with weather and man-made events. Sunny days result in dry road surfaces. Rainy days result in wet road surfaces. Construction work results in muddy road surfaces. If the enhance-pressure control period $T_{increase}$ and the reduce-pressure control period $T_{decrease}$ are set for the purpose of the friction of dry road surface, such control periods $T_{increase}$, $T_{decrease}$ will have worse performance on wet road surfaces. On the contrary, if the enhance-pressure control period Increase and the reduce-pressure control period $T_{decrease}$ are set for the purpose of the friction of wet road surface, the distance to stop the vehicle would be longer. Therefore, the conventional braking method of ABS should be improved.

SUMMARY OF THE INVENTION

An objective of the present invention is to provide a braking control method according to friction of road surface to overcome the defect of the conventional method failing to adaptively brake the vehicle on different road environments.

The braking control method according to friction of road surface of the present invention is performed by a control module of an anti-lock braking system connected to a wheel speed sensor. The control module receives a signal of a wheel speed from the wheel speed sensor and performs an intermittent brake mode including a stepped pressure-increasing phase or a stepped pressure-decreasing phase. The braking control method is applied to the stepped pressure-increasing phase and the stepped pressure-decreasing phase. The braking control method comprises:

computing a real-time wheel speed according to the signal received from the wheel speed sensor;

storing the real-time wheel speed as a wheel initial velocity when a braking event occurs;

determining a relative-peak value according to the real-time wheel speed;

estimating a vehicle deceleration according to the relative-peak value and the wheel initial velocity;

computing an adjustment parameter according to the vehicle deceleration and a tire slip threshold, wherein the adjustment parameter reflects a friction coefficient of road surface; and adjusting a time length of an enhancement stage in an enhance-pressure control period of the stepped pressure-increasing phase according to the adjustment parameter; or adjusting a time length of a reduction stage in a reduce-pressure control period of the stepped pressure-decreasing phase according to the adjustment parameter.

The present invention utilizes the feature that the vehicle deceleration has relation with the friction coefficient of road surface. For example, in comparison of higher and lower friction coefficients of road surface, the wheels of the vehicle would not be rapidly locked up when the vehicle is suddenly braked on the road with a higher friction coefficient, such that the braking effect is good, the vehicle slows down accordingly, and the vehicle deceleration is higher. On the contrary, the wheels of the vehicle would be rapidly locked up when the vehicle is suddenly braked on the road with a lower friction coefficient, such that the braking effect is worse, the vehicle fails to slow down accordingly, and the vehicle deceleration is lower.

As mentioned above, the vehicle deceleration has relation with the friction coefficient of road surface. In the present invention, the adjustment parameters are applied to adjust the stepped pressure-increasing phase and the stepped pressure-decreasing phase. The adjustment parameters are computed in accordance with the vehicle decelerations having relation with the friction coefficient of road surface. Therefore, the braking control method of the present invention performs the braking process according to the friction coefficient and thus adaptively and effectively brakes the vehicle on different road environments.

DETAILED DESCRIPTION OF PREFERRED EMBODIMENT(S)

Figure 1:
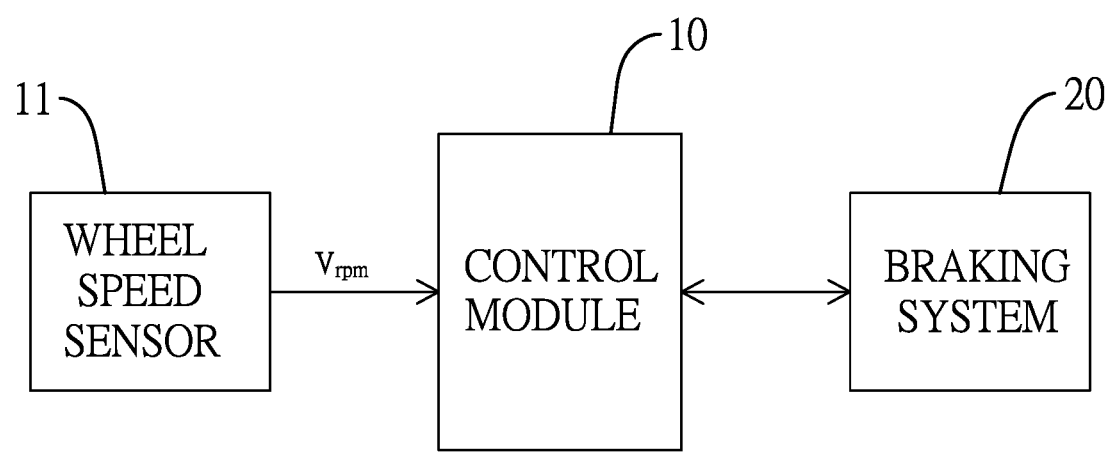
FIG. 1 is a block diagram of an anti-lock braking system of the present invention.

With reference to FIG. 1, an anti-lock braking system (ABS) essentially comprises a control module 10 and a wheel speed sensor 11 electrically connected to the control module 10. The control module 10 is electrically connected to a braking system 20 of a vehicle (such as a car, a truck, a scooter, and so on) for signal transmission. The control module 10 receives a signal $v_{rpm}$ of wheel speed from the wheel speed sensor 11 wherein the signal $v_{rpm}$ of the wheel speed is a number of revolutions of the wheel per minute detected by the wheel speed sensor 11. The control module 10 will compute a real-time wheel speed $v_{wheel}$ according to the signal $v_{rpm}$. The real-time wheel speed $v_{wheel}$ will be represented as:

$$v_{wheel} = \frac{v_{rpm} \times 2\pi r}{60} \times \frac{60 \times 60}{1000} \left( \frac{kilometer}{hour} \right)$$

In the above equation, r is a radius of the wheel and a unit of the radius is meter (m). The unit of the real-time wheel speed $v_{wheel}$ is kilometers-per-hour.

Figure 2:
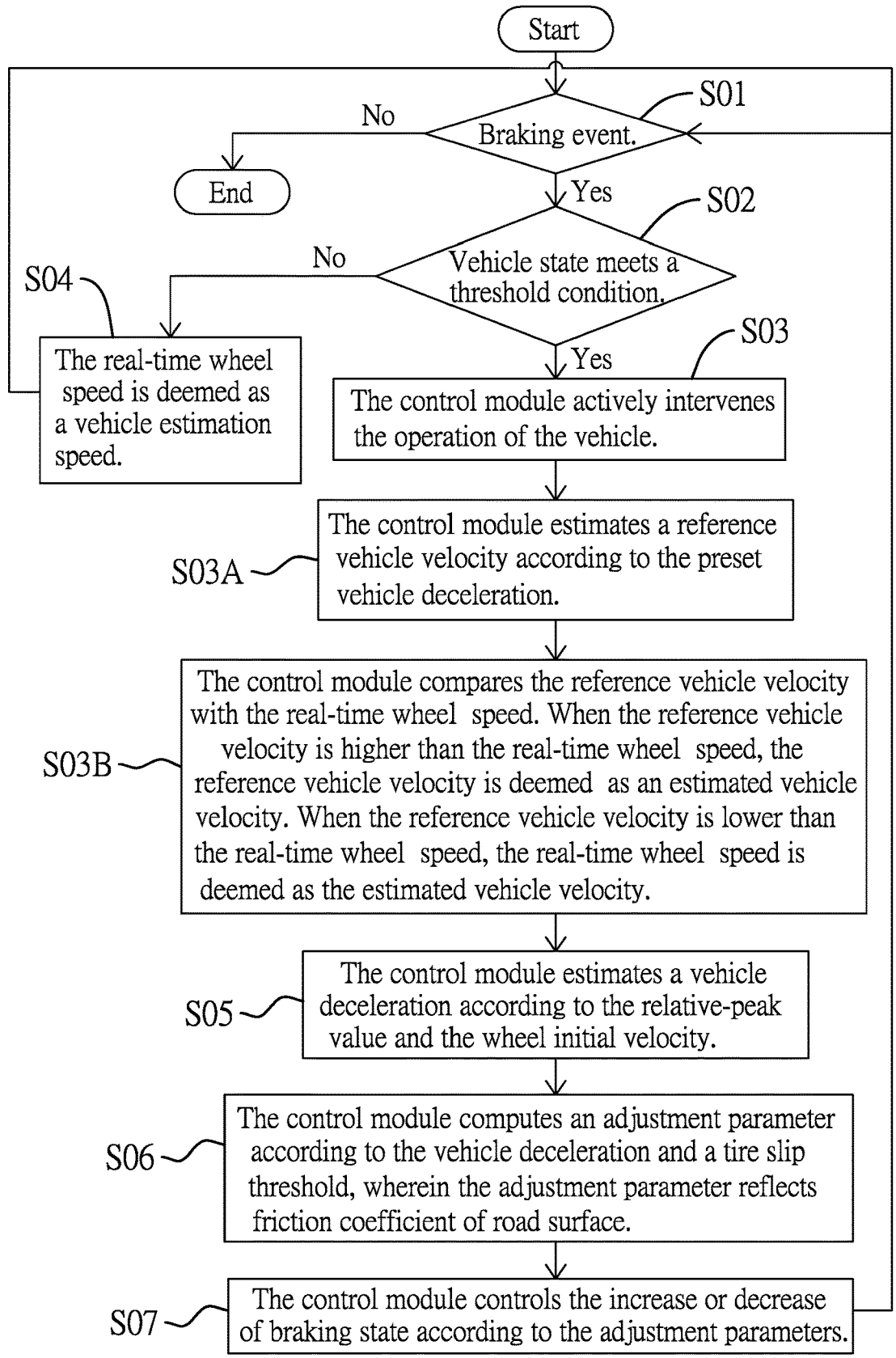
FIG. 2 is a flow chart of an embodiment of the present invention.

In general, after the vehicle is started, the control module 10 will record the real-time wheel speed $v_{wheel}$. With reference to FIG. 2, at first, the control module 10 determines whether a braking event occurs or not (STEP S01). When the barking event occurs, the control module 10 further determines whether a vehicle state meets a threshold condition or not (STEP S02). When the vehicle state meets the threshold condition, the control module 10 actively intervenes the operation of the vehicle (STEP S03). For example, the vehicle state will include the real-time wheel speed $v_{wheel}$. When the real-time wheel speed $v_{wheel}$ is decreasing while the variation of the real-time wheel speed v in a unit of time is equal to or higher than a threshold as the threshold condition, which means the revolution speed of the wheel rapidly slows down, the wheels will be rapidly locked up. On the contrary, in the STEP S02, when the vehicle state does not meet the threshold condition, which means the decrease of the wheel speed is acceptable and the vehicle is still controllable by the driver, the control module 10 would not intervene the operation of the vehicle and the vehicle will be normally braked. Besides, in the STEP S02, when the vehicle state does not meet the threshold condition, the real-time wheel speed $v_{wheel}$ is deemed as a vehicle estimation speed (STEP S04) and then the control module 10 returns to the STEP S01.

After the control module 10 actively intervenes the operation of the vehicle, the control module 10 will perform an intermittent brake mode. The intermittent brake mode includes a pressure-decreasing phase, a pressure-retaining phase, and a pressure-increasing phase, wherein the pressure-decreasing phase, the pressure-retaining phase, and the pressure-increasing phase occur in sequence. The pressure-decreasing phase will be a stepped pressure-decreasing phase. The pressure-increasing phase will be a stepped pressure-increasing phase. As a result, the intermittent brake mode will include the stepped pressure-decreasing phase or the stepped pressure-increasing phase or both.

It is to be noted that the intermittent brake mode, conditions to enter the stepped pressure-increasing phase and the stepped pressure-decreasing phase, and pressure increasing speed in the stepped pressure-increasing phase and pressure decreasing speed in the stepped pressure-decreasing phase, performed by ABS are conventional arts, and thus would not be described in detail herein.

In the embodiment of the present invention, the control module 10 actively intervenes the operation of the vehicle to adjust a time length of an enhancement stage in an enhance-pressure control period of the stepped pressure-increasing phase according to friction of road surface, or adjust a time length of a reduction stage in a reduce-pressure control period of the stepped pressure-decreasing phase according to the adjustment parameter. The detailed contents of the present invention are described in the following paragraphs.

1. Wheel Initial Velocity

Figure 3A:
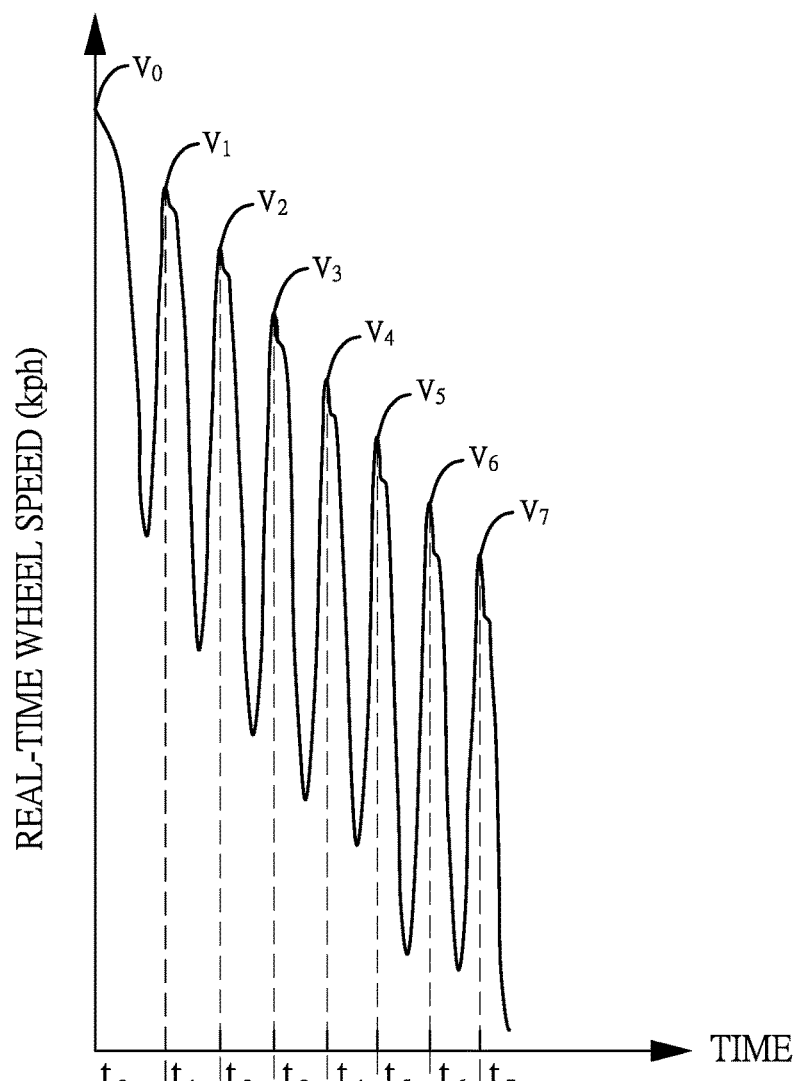
FIG. 3A is a waveform diagram of a real-time wheel speed of the present invention.

As mentioned above, after the vehicle is started, the control module 10 records the real-time wheel speed $v_{wheel}$. In the embodiment of the present invention, the control module 10 stores the real-time wheel speed $v_{wheel}$ as a wheel initial velocity when a braking event, such as when the brake pedal of the vehicle is pressed down, occurs. With reference to FIG. 3A, the control module 10 will determine the braking event at $t_0$, and the real-time wheel speed $v_{wheel}$ at $t_0$ is stored as the wheel initial velocity $v_0$. In other words, $t_0$ is the time that $v_0$ occurs.

2. Relative-Peak Value

During the intermittent brake mode, the real-time wheel speed $v_{wheel}$ varies with time. The control module 10 will determine a relative-peak value according to the real-time wheel speed $v_{wheel}$. For example, with reference to FIG. 3A, when the slope of the curve of the real-time wheel speed $v_{wheel}$ is changed from a positive slope to a negative slope at $t_1$, the control module 10 determines the real-time wheel speed $v_{wheel}$ at $t_1$ as the relative-peak value. Hence, the control module 10 will determine the relative-peak value according to a slope change of the curve of the real-time wheel speed $v_{wheel}$ from a positive slope to a negative slope. As time goes on, the control module 10 will determine several relative-peak values $v_2$, $v_3$ . . . during the process of the intermittent brake mode.

3. Estimation of a Vehicle Deceleration

In the embodiment of the present invention, the vehicle deceleration is estimated according to the relative-peak value and the wheel initial velocity $v_0$ and will be represented as:

$$a_x = \frac{|v_x - v_0|}{t_x - t_0}$$

In the above equation, $a_x$ is the $x^{th}$ vehicle deceleration, $v_x$ is the $x^{th}$ relative-peak value, $t_x$ is the time when $v_x$ occurs, $v_0$ is the wheel initial velocity, and $t_0$ is the time when $v_0$ occurs. With reference to FIG. 3A, when the control module 10 determines the first relative-peak value $v_1$ at $t_1$, the control module 10 will estimate a first vehicle deceleration $a_1$ according to the first relative-peak value $v_1$ and the wheel initial velocity $v_0$. The first vehicle deceleration $a_1$ will be represented as:

$$a_1 = \frac{|v_1 - v_0|}{t_1 - t_0}$$

Furthermore, based on the first vehicle deceleration $a_1$, the control module 10 estimates a first vehicle velocity $v_{vehicle,1}$ that will be represented as:

$$v_{vehicle,1} = v_0 - a_1 \times t$$

In the above equation, t is an elapsed time after the braking event occurs.

As time goes on, when the control module 10 determines the second relative-peak value $v_2$ at $t_2$, the control module 10 then estimates a second vehicle deceleration $a_2$ according to the second relative-peak value $v_2$ and the wheel initial velocity $v_0$. The second vehicle deceleration $a_2$ will be represented as:

$$a_2 = \frac{|v_2 - v_0|}{t_2 - t_0}$$

Furthermore, based on the second vehicle deceleration $a_2$, the control module 10 estimates a second vehicle velocity $v_{vehicle,2}$ that will be represented as:

$$v_{vehicle,2} = v_0 - a_2 \times t$$

In the above equation, t is an elapsed time after the braking event occurs.

As a result, after the braking event occurs, as time goes on, the control module 10 will estimate several vehicle decelerations according to the relative-peak values and the wheel initial velocity (STEP S05). Besides, the vehicle decelerations and the wheel initial velocity will be used to estimate the vehicle velocity $v_{vehicle}$. The estimated vehicle velocity $v_{vehicle}$ will be represented as:

$$v_{vehicle} = v_0 - a \times t$$

In the above equation, t is an elapsed time after the braking event occurs.

In the embodiment of the present invention, the vehicle decelerations and the estimated vehicle velocity are updated with the variation of the real-time wheel speed $v_{wheel}$.

In order to estimate the vehicle velocity at the time after to and before $t_1$, with reference to FIG. 3A, in the embodiment of the present invention, a preset vehicle deceleration $a_{preset}$ is used. The control module 10 estimates a reference vehicle velocity $v_{ref}$ after to and before $t_1$ according to the preset vehicle deceleration $a_{preset}$ (STEP S03A). The reference vehicle velocity $v_{ref}$ will be represented as:

$$v_{ref} = v_0 - a_{preset} \times t$$

In the above equation, t is an elapsed time after the braking event occurs and before $t_1$. Afterwards, the control module 10 compares the reference vehicle velocity $v_{ref}$ with the real-time wheel speed $v_{wheel}$. When the reference vehicle velocity $v_{ref}$ is higher than the real-time wheel speed $v_{wheel}$, the reference vehicle velocity $v_{ref}$ is deemed as an estimated vehicle velocity. On the contrary, when the reference vehicle velocity $v_{ref}$ is lower than the real-time wheel speed v the real-time wheel speed v is deemed as the estimated vehicle velocity (STEP S03B). The preset vehicle deceleration $a_{preset}$ will be higher than 0 and lower than 1 g, wherein g is equal to 9.8 (meter/second).

4. Adjustment Parameter for Reflecting the Friction Coefficient of Road Surface In the embodiment of the present invention, after the control module 10 intervenes the operation of the vehicle, the control module 10 computes an adjustment parameter according to a present vehicle deceleration obtained in the STEP S05 and a tire slip threshold (STEP S06). The adjustment parameter will be represented as:

$$u = \frac{a}{1 - ABSout}$$

In the above equation, u is the adjustment parameter for reflecting the friction coefficient of road surface, a is the vehicle deceleration, and ABSout is the tire slip threshold.

The tire slip threshold ABSout is a constant preset in the control module 10. The value of the tire slip threshold ABSout is higher than 0 and lower than 1, i.e., 0<ABSout<1. When the anti-lock braking system determines that an actual tire slip is equal to or higher than the tire slip threshold ABSout, the anti-lock braking system will control the braking system 20 to stop a pressure-decreasing mode and start a pressure-increasing mode, and that would be an inherent function of the conventional anti-lock braking system. However, the inherent function will affect the vehicle deceleration. As a result, the estimated vehicle deceleration will be lower than an actual vehicle deceleration. In order to overcome the inconsistency, (1-ABSout) in the present invention is a correction factor for the adjustment parameter to meet the actual condition. In the arts of vehicles, a tire slip equation will be represented as:

tire slip (%)=|vehicle velocity−wheel speed|/vehicle velocity×100(%)

In comparison of dry road surface and wet road surface, the dry road surface has a higher friction coefficient than the wet road surface. The performance of the wheels rotating on the dry road surface would be better than that on the wet road surface. Hence, when the vehicle is braked, the vehicle deceleration of the wheels corresponding to the dry road surface will be lower than that corresponding to the wet road surface. In addition, the adjustment parameter is computed according to the vehicle deceleration. Hence, the adjustment parameter will reflect the friction coefficient of road surface. In other words, lower adjustment parameter corresponds to lower vehicle deceleration and lower friction coefficient of road surface, and higher adjustment parameter corresponds to higher vehicle deceleration and higher friction coefficient of road surface.

Figure 3B:
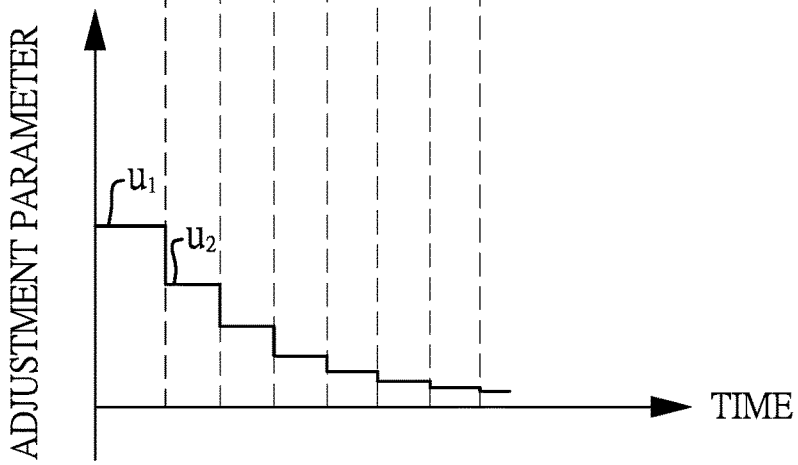
FIG. 3B is a waveform diagram of the adjustment parameter of the present invention.

With reference to FIG. 3B, as time goes on, several adjustment parameters will be respectively computed according to different vehicle decelerations. For example, a first adjustment parameter $u_1$ will be computed according to the first vehicle deceleration $a_1$ and represented as:

$$u_1 = \frac{a_1}{1 - ABSout}$$

A second adjustment parameter $u_2$ will be computed according to the second vehicle deceleration $a_2$ and represented as:

$$u_2 = \frac{a_2}{1 - ABSout}$$

Calculation of the following adjustment parameters will be deduced from the above descriptions.

5. Control the Braking System Based on the Adjustment Parameters

Figure 4A:
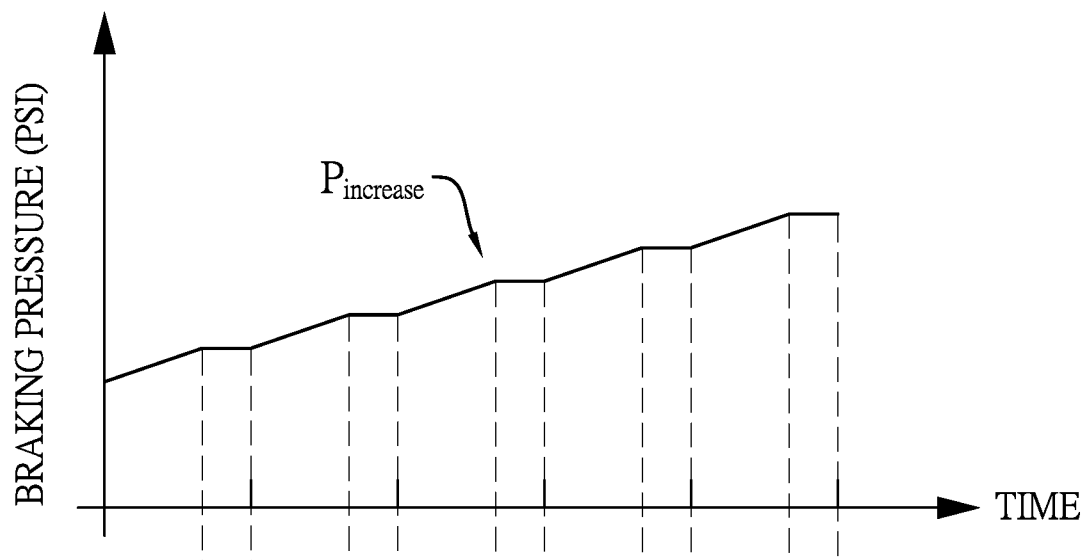
FIG. 4A is a waveform diagram of braking pressure in the stepped pressure-increasing phase of the present invention.
Figure 4B:
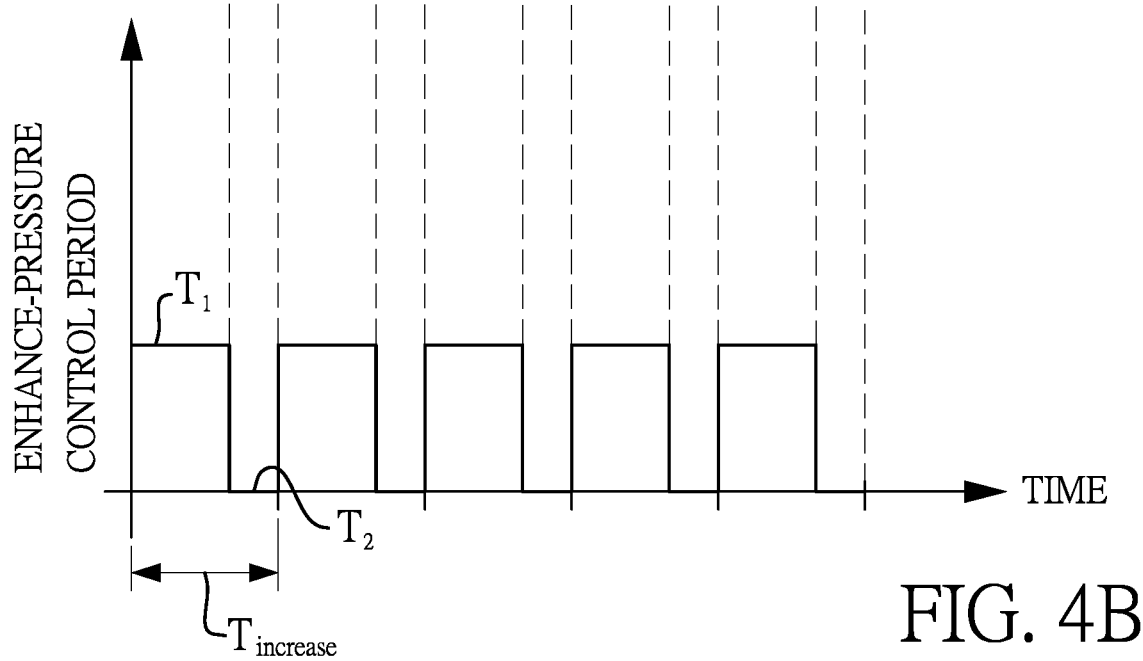
FIG. 4B is a time diagram of the enhance-pressure control period of the present invention.

With reference to FIGS. 4A and 4B, when the process performed by the control module 10 enters any one of the stepped pressure-increasing phases $P_{increase}$, a present adjustment parameter has been computed. The stepped pressure-increasing phase $P_{increase}$ includes one or more than one enhance-pressure control period $T_{increase}$. Each enhance-pressure control period $T_{increase}$ includes an enhancement stage in a time length T1 and a retaining stage in a time length T2. The retaining stage is sequentially after the enhancement stage. The control module 10 adjusts the time lengths of the enhancement stage and the retaining stage according to the present adjustment parameter in the enhance-pressure control period $T_{increase}$. Hence, the control module 10 controls the increase of braking state according to the adjustment parameters (STEP S07). When the adjustment parameter reflects a higher friction coefficient of road surface, the time length T1 of the enhancement stage in the enhance-pressure control period $T_{increase}$ is adjusted by the control module 10 to be longer. On the contrary, when the adjustment parameter reflects a lower friction coefficient of road surface, the time length T1 of the enhancement stage in the enhance-pressure control period $T_{increase}$ is adjusted by the control module 10 to be shorter.

Figure 5A:
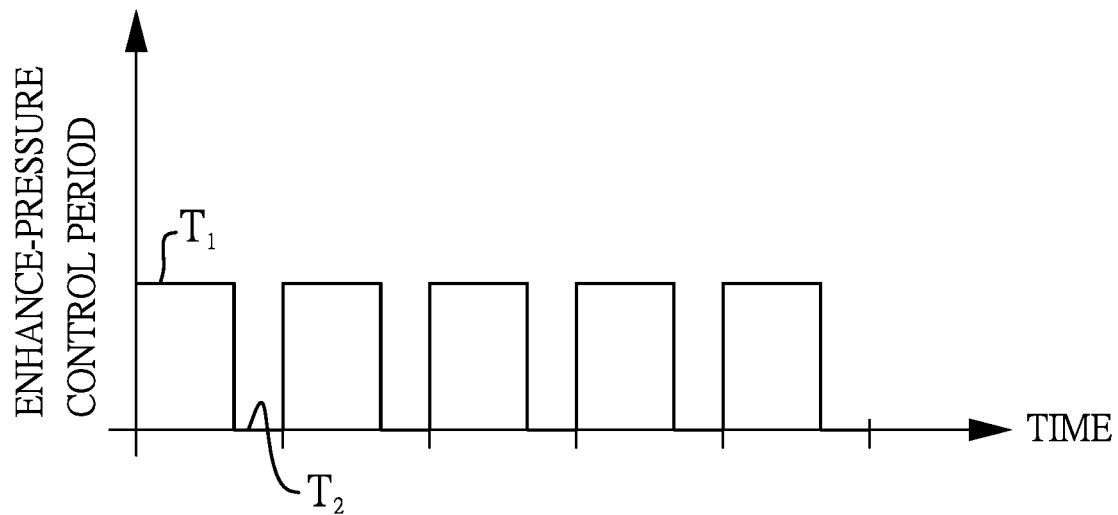
FIG. 5A is a time diagram of the enhance-pressure control period of the present invention.
Figure 5B:
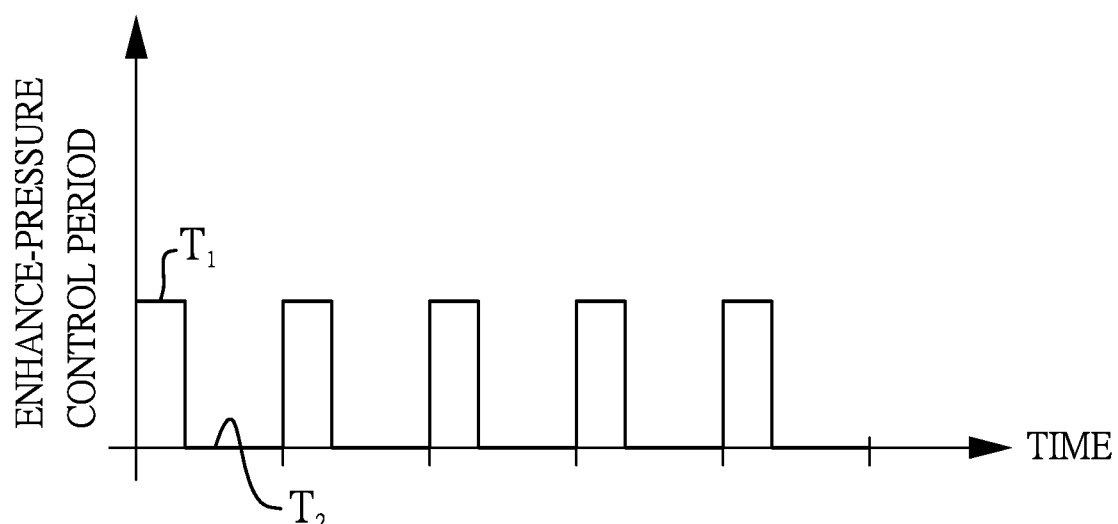
FIG. 5B is a time diagram of the enhance-pressure control period of the present invention.

For example, in comparison of FIGS. 5A and 5B, when the adjustment parameter reflects a higher friction coefficient of road surface, the time length T1 of the enhancement stage will be extended as shown in FIG. 5A. Because the time length of each enhance-pressure control period $T_{increase}$ is the same, the time length T2 of the retaining stage becomes shorter accordingly. On the contrary, as shown in FIG. 5B, when the adjustment parameter reflects a lower friction coefficient of road surface, the time length T1 of the enhancement stage will be shortened. Because the time length of the enhance-pressure control period $T_{increase}$ is the same, the time length T2 of the retaining stage becomes longer accordingly. In FIGS. 5A and 5B, as an example, the time length of the enhance-pressure control period $T_{increase}$ will be 20 milliseconds (ms), wherein T1 will be 15 ms and T2 will be 5 ms in FIG. 5A, and T1 will be 5 ms and T2 will be 15 ms in FIG. 5B.

Figure 6A:
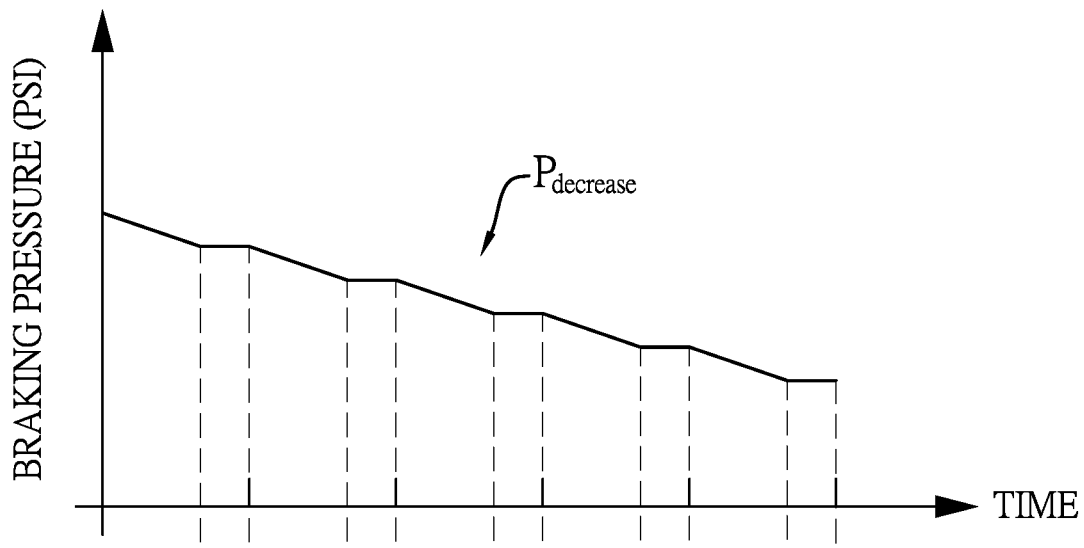
FIG. 6A is a waveform diagram of braking pressure in the stepped pressure-decreasing phase of the present invention.
Figure 6B:
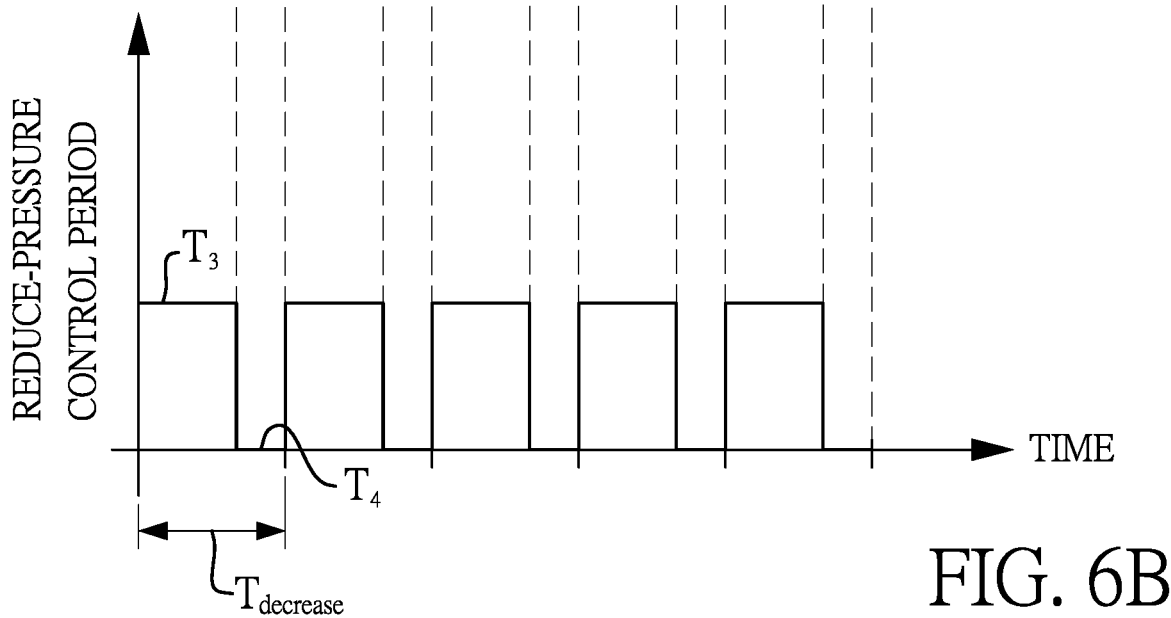
FIG. 6B is a time diagram of the reduce-pressure control period of the present invention.

With reference to FIGS. 6A and 6B, when the process performed by the control module 10 enters any one of the stepped pressure-decreasing phases $P_{decrease}$, a present adjustment parameter has been computed. The stepped pressure-decreasing phase $P_{decrease}$ includes one or more than one reduce-pressure control period $T_{decrease}$. Each reduce-pressure control period $T_{decrease}$ includes a reduction stage in a time length T3 and a retaining stage in a time length T4. The retaining stage is sequentially after the reduction stage. The control module 10 adjusts the time lengths of the reduction stage and the retaining stage according to the present adjustment parameter in the reduce-pressure control period $T_{decrease}$. Hence, the control module 10 controls the decrease of braking state according to the adjustment parameters (STEP S07). When the adjustment parameter reflects a higher friction coefficient of road surface, the time length T3 of the reduction stage in the reduce-pressure control period $T_{decrease}$ is adjusted by the control module 10 to be shorter. On the contrary, when the adjustment parameter reflects a lower friction coefficient of road surface, the time length T3 of the reduction stage in the reduce-pressure control period $T_{decrease}$ is adjusted by the control module 10 to be longer.

Figure 7A:
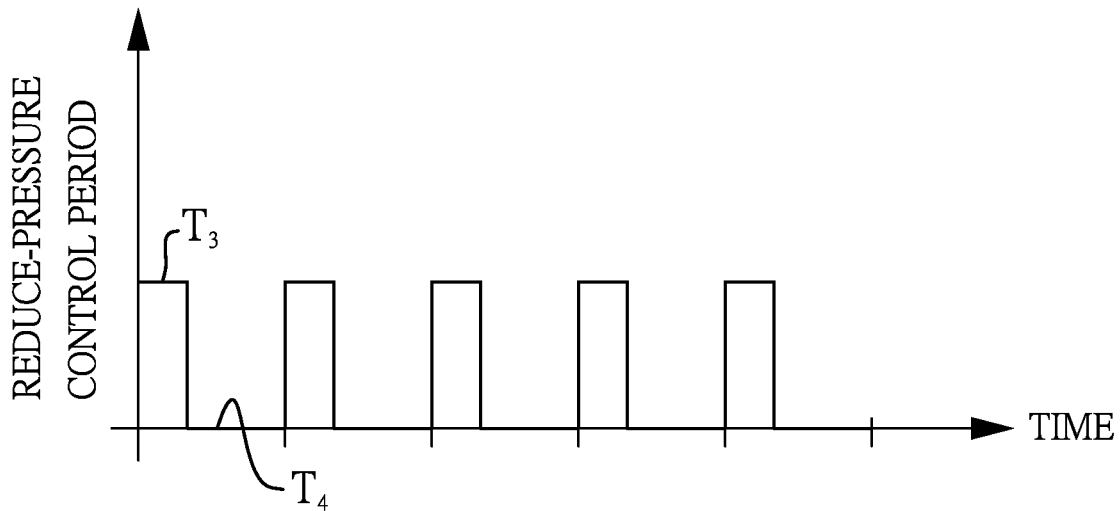
FIG. 7A is a time diagram of the reduce-pressure control period of the present invention.
Figure 7B:
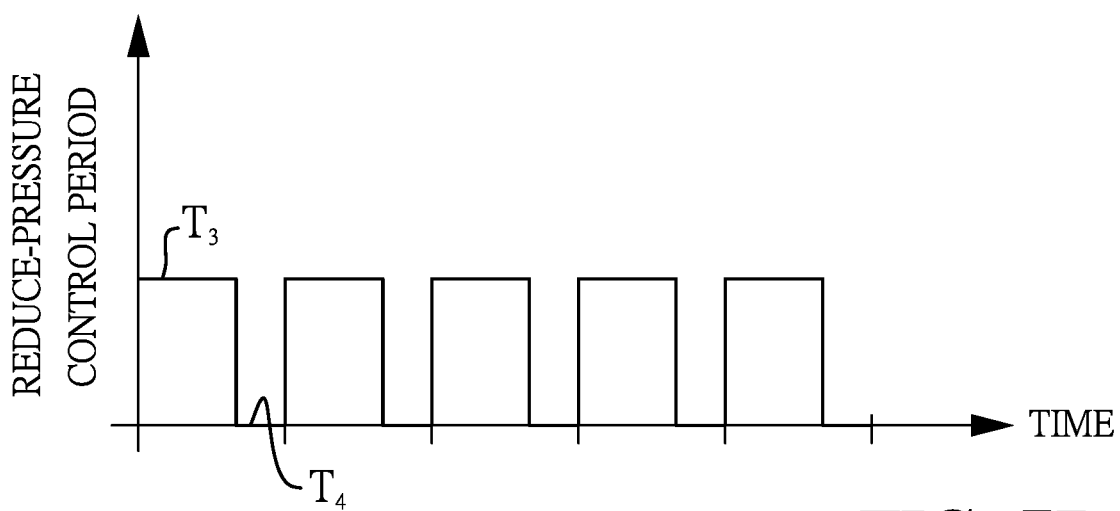
FIG. 7B is a time diagram of the reduce-pressure control period of the present invention.
Figure 8:
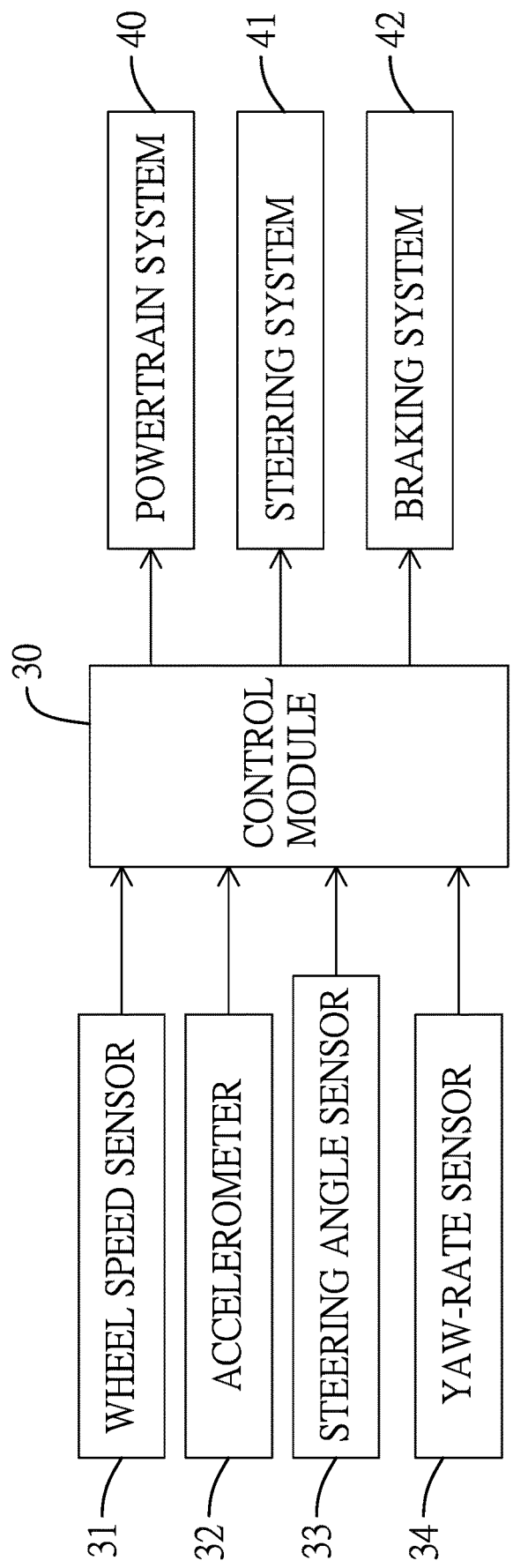
FIG. 8 is a block diagram of an electronic stability control system (ESC)
Figure 9:
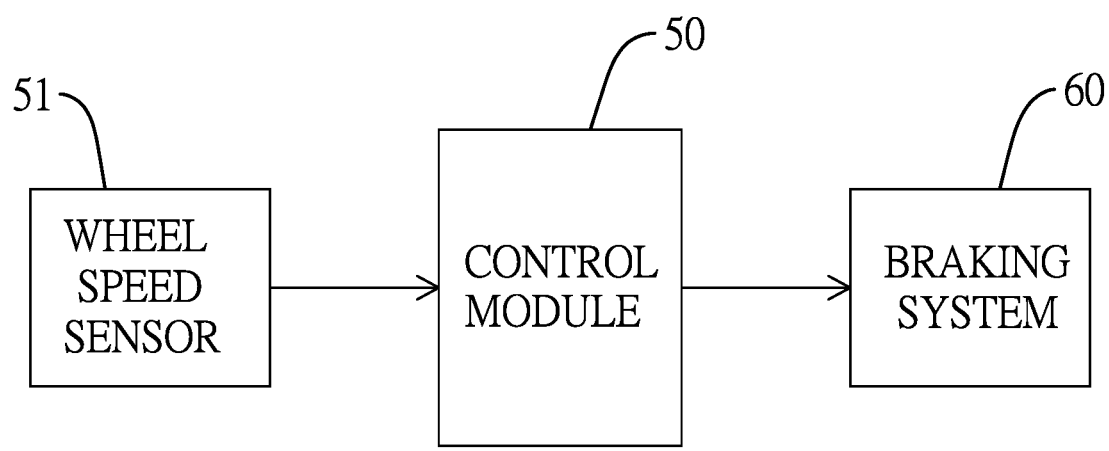
FIG. 9 is a block diagram of an anti-lock braking system (ABS)
Figure 10A:
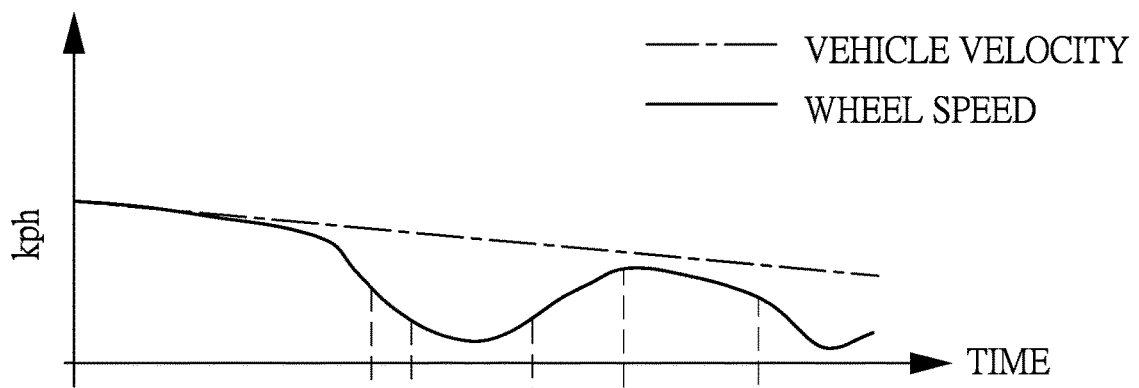
FIG. 10A is a waveform diagram of vehicle velocity and wheel speed after a braking event occurs.
Figure 10B:
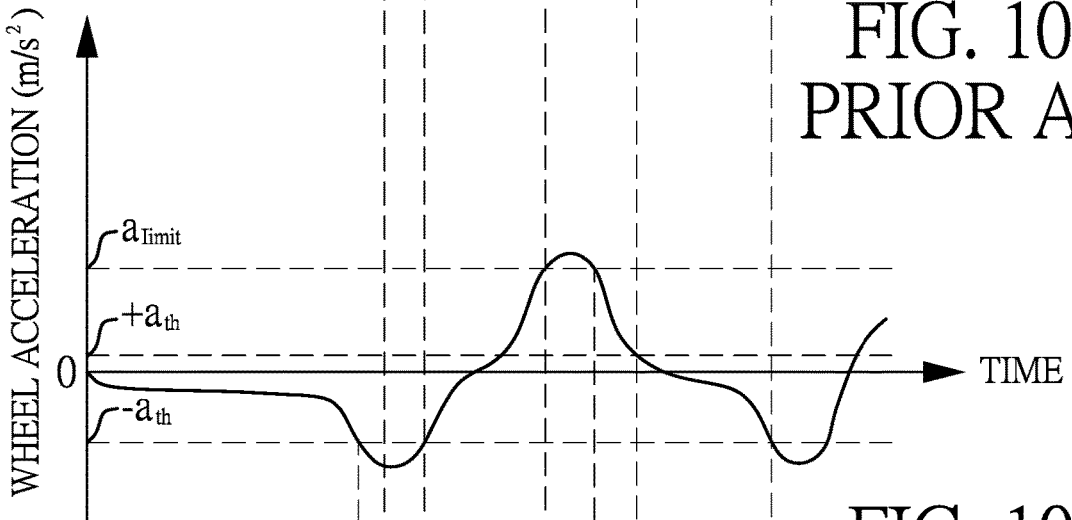
FIG. 10B is a waveform diagram of wheel acceleration after a braking event occurs.
Figure 10C:
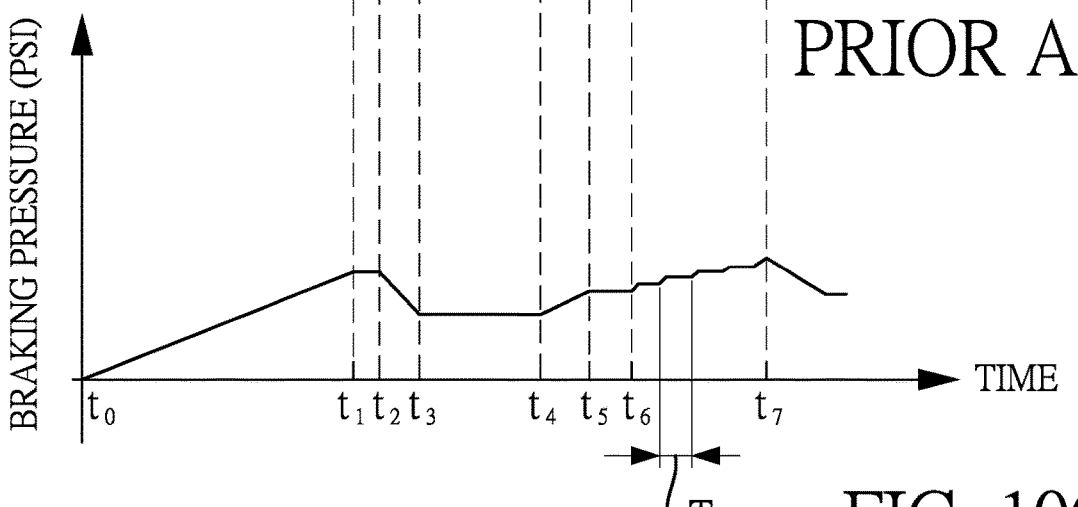
FIG. 10C is a waveform diagram of braking pressure after a braking event occurs.
Figure 11A:
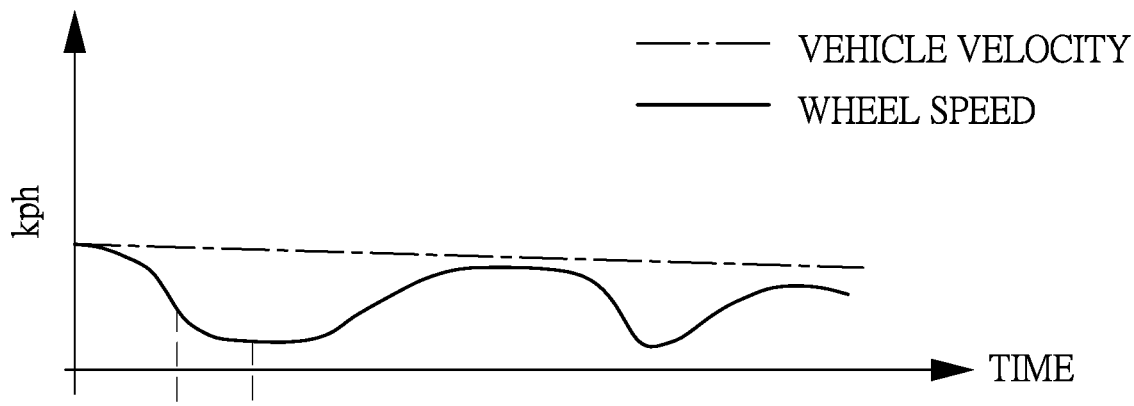
FIG. 11A is a waveform diagram of vehicle velocity and wheel speed after a braking event occurs.
Figure 11B:
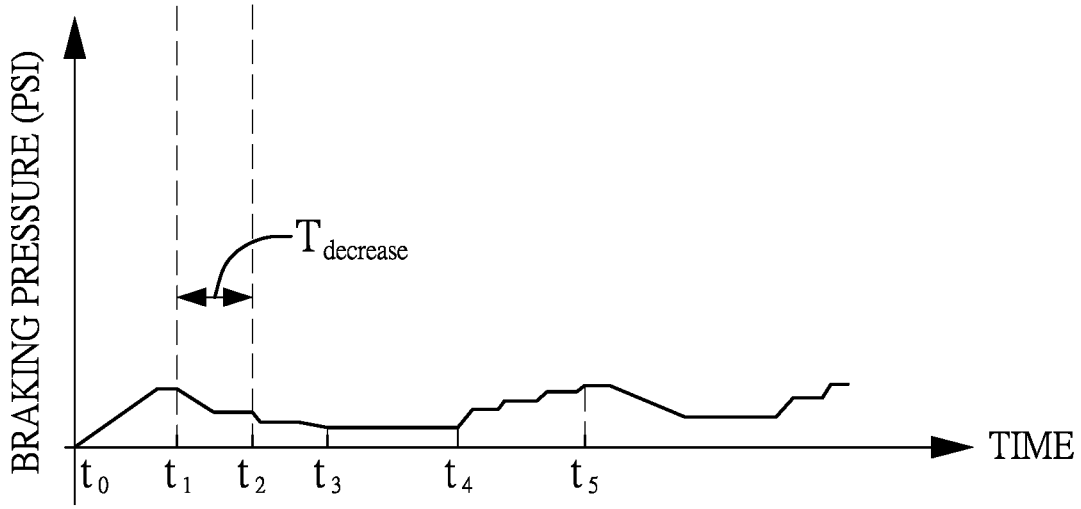
FIG. 11B is a waveform diagram of braking pressure after a braking event occurs.

For example, in comparison of FIGS. 7A and 7B, when the adjustment parameter reflects a higher friction coefficient of road surface, the time length T4 of the retaining stage will be extended and the time length T3 of the reduction stage is accordingly shortened as shown in FIG. 7A. On the contrary, as shown in FIG. 7B, when the adjustment parameter reflects a lower friction coefficient of road surface, the time length T3 of the reduction stage will be extended and the time length T4 of the retaining stage is accordingly shortened. In FIGS. 7A and 7B, as an example, the time length of the reduce-pressure control period $T_{decrease}$ will be 20 milliseconds (ms), wherein T3 in FIG. 7A will be 5 ms and T3 in FIG. 7B will be 15 ms.

In conclusion, the braking control method of the present invention brakes the vehicle according to the adjustment parameters. Because the adjustment parameters reflect the friction coefficient of road surface, the present invention will adaptively adjust the time length of the enhancement stage in the enhance-pressure control periods $T_{increase}$ or adaptively adjust the time length of the reduction stage on the reduce-pressure control periods $T_{decrease}$ in different conditions of road surfaces. Hence, the wheels of the vehicle avoid being rapidly locked up and retain rotation in a certain speed to maintain the friction against the road surface.

Even though numerous characteristics and advantages of the present invention have been set forth in the foregoing description, together with details of the structure and function of the invention, the disclosure is illustrative only, and changes will be made in detail, especially in matters of shape, size, and arrangement of parts within the principles of the invention to the full extent indicated by the broad general meaning of the terms in which the appended claims are expressed.

What is claimed is:

1. A braking control method according to friction of road surface, performed by a control module of an anti-lock braking system connected to a wheel speed sensor, wherein the control module receives a signal of a wheel speed from the wheel speed sensor and performs an intermittent brake mode including a stepped pressure-increasing phase or a stepped pressure-decreasing phase, and the braking control method is applied to the stepped pressure-increasing phase and the stepped pressure-decreasing phase; the braking control method comprising: computing a real-time wheel speed according to the signal received from the wheel speed sensor; storing the real-time wheel speed as a wheel initial velocity when a braking event occurs; determining a relative-peak value according to the real-time wheel speed; estimating a vehicle deceleration according to the relative-peak value and the wheel initial velocity; computing an adjustment parameter according to the vehicle deceleration and a tire slip threshold, wherein the adjustment parameter reflects a friction coefficient of road surface; adjusting a time length of an enhancement stage in an enhance-pressure control period of the stepped pressure-increasing phase according to the adjustment parameter; or adjusting a time length of a reduction stage in a reduce-pressure control period of the stepped pressure-decreasing phase according to the adjustment parameter; and controlling an increase or a decrease of a braking state according to the adjustment parameter.

2. The braking control method as claimed in claim 1, wherein
the time length of the enhancement stage becomes longer when the friction coefficient of road surface becomes higher; and
the time length of the enhancement stage becomes shorter when the friction coefficient of road surface becomes lower.

3. The braking control method as claimed in claim 2, wherein
the time length of the reduction stage becomes shorter when the friction coefficient of road surface becomes higher; and
the time length of the reduction stage becomes longer when the friction coefficient of road surface becomes lower.

4. The braking control method as claimed in claim 3, wherein
the stepped pressure-increasing phase includes multiple said enhance-pressure control periods in sequence and of the same time length, and each one of the enhance-pressure control periods has the enhancement stage adjustable by the adjustment parameter and a retaining stage after the enhancement stage; and
the stepped pressure-decreasing phase includes multiple said reduce-pressure control periods in sequence and of the same time length, and each one of the reduce-pressure control periods has the reduction stage adjustable by the adjustment parameter and a retaining stage after the reduction stage.

5. The braking control method as claimed in claim 4, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

6. The braking control method as claimed in claim 4, wherein the vehicle deceleration is represented as:

$$a_x = \frac{|v_x - v_0|}{t_x - t_0}$$

wherein $a_x$ is the $x^{th}$ vehicle deceleration, $v_x$ is the $x^{th}$ relative-peak value, $t_x$ is the time when $v_x$ occurs, $v_0$ is the wheel initial velocity, and $t_0$ is the time when $v_0$ occurs.

7. The braking control method as claimed in claim 4, wherein the wheel initial velocity is represented as:

$$v_{wheel} = \frac{v_{rpm} \times 2 \prod r}{60} \times \frac{60 \times 60}{1000} \left(\frac{\text{kilometer}}{\text{hour}}\right)$$

wherein $v_{wheel}$ is the real-time wheel speed, $v_{rpm}$ is a number of revolutions of the wheel per minute detected by the wheel speed sensor, and r is a radius of the wheel and a unit of the radius is meter.

8. The braking control method as claimed in claim 4, wherein the control module determines the relative-peak value according to a slope change of curve of the real-time wheel speed from a positive slope to a negative slope.

9. The braking control method as claimed in claim 3, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

10. The braking control method as claimed in claim 2, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

11. The braking control method as claimed in claim 1, wherein
the time length of the reduction stage becomes shorter when the friction coefficient of road surface becomes higher; and
the time length of the reduction stage becomes longer when the friction coefficient of road surface becomes lower.

12. The braking control method as claimed in claim 11, wherein
the stepped pressure-increasing phase includes multiple said enhance-pressure control periods in sequence and of the same time length, and each one of the enhance-pressure control periods has the enhancement stage adjustable by the adjustment parameter and a retaining stage after the enhancement stage;

the stepped pressure-decreasing phase includes multiple said reduce-pressure control periods in sequence and of the same time length, and each one of the reduce-pressure control periods has the reduction stage adjustable by the adjustment parameter and a retaining stage after the reduction stage.

13. The braking control method as claimed in claim 12, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

14. The braking control method as claimed in claim 12, wherein the vehicle deceleration is represented as:

$$a_x = \frac{|v_x - v_0|}{t_x - t_0}$$

wherein $a_x$ is the $x^{th}$ vehicle deceleration, $v_x$ is the $x^{th}$ relative-peak value, $t_x$ is the time when $v_x$ occurs, $v_0$ is the wheel initial velocity, and $t_0$ is the time when $v_0$ occurs.

15. The braking control method as claimed in claim 12, wherein the wheel initial velocity is represented as:

$$v_{wheel} = \frac{v_{rpm} \times 2 \prod r}{60} \times \frac{60 \times 60}{1000} \left(\frac{\text{kilometer}}{\text{hour}}\right)$$

wherein $v_{wheel}$ is the real-time wheel speed, $v_{rpm}$ is a number of revolutions of the wheel per minute detected by the wheel speed sensor, and r is a radius of the wheel and a unit of the radius is meter.

16. The braking control method as claimed in claim 12, wherein the control module determines the relative-peak value according to a slope change of curve of the real-time wheel speed from a positive slope to a negative slope.

17. The braking control method as claimed in claim 11, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

18. The braking control method as claimed in claim 1, wherein the adjustment parameter is represented as:

$$u = \frac{a}{1 - ABSout}$$

wherein u is the adjustment parameter for reflecting the friction coefficient of road surface, a is the vehicle deceleration, and ABSout is the tire slip threshold higher than 0 and lower than 1.

* * * * *